US012653259B2

(12) United States Patent
Griggio

(10) Patent No.: US 12,653,259 B2
(45) Date of Patent: Jun. 16, 2026

(54) METHOD FOR DETECTING BODY MEASUREMENTS TO DETERMINE SIZES OF A TAILOR-MADE GARMENT

(71) Applicant: PGM12 SOCIETÀ A RESPONSABILITÀ LIMITATA SEMPLIFICATA, Padua (IT)

(72) Inventor: Paola Griggio, Padua (IT)

(73) Assignee: PGM12 S.R.L., Padua (IT)

( * ) Notice: Subject to any disclaimer, the term of this patent is extended or adjusted under 35 U.S.C. 154(b) by 615 days.

(21) Appl. No.: 18/552,737

(22) PCT Filed: Sep. 30, 2021

(86) PCT No.: PCT/IB2021/058988
§ 371 (c)(1),
(2) Date: Sep. 27, 2023

(87) PCT Pub. No.: WO2022/070126
PCT Pub. Date: Apr. 7, 2022

(65) Prior Publication Data
US 2024/0365903 A1 Nov. 7, 2024

(30) Foreign Application Priority Data
Oct. 1, 2020 (IT) ........................ 102020000023179

(51) Int. Cl.
*A41H 3/04* (2006.01)
*G06T 7/60* (2017.01)
*G06T 7/73* (2017.01)

(52) U.S. Cl.
CPC ................. *A41H 3/04* (2013.01); *G06T 7/60* (2013.01); *G06T 7/73* (2017.01); *G06T 2207/30196* (2013.01); *G06T 2207/30208* (2013.01)

(58) Field of Classification Search
CPC .... A41H 3/04; A41H 1/02; G06T 7/60; G06T 7/73; G06T 2207/30196;
(Continued)

(56) References Cited

U.S. PATENT DOCUMENTS

| | | | |
|---|---|---|---|
| 2004/0227752 A1 | 11/2004 | Mccartha et al. | |
| 2017/0109856 A1* | 4/2017 | Inazumi ................... | G06T 7/73 |
| 2018/0089851 A1* | 3/2018 | Kuo ...................... | G01B 11/002 |

FOREIGN PATENT DOCUMENTS

| | | | |
|---|---|---|---|
| CN | 101017212 | * | 8/2007 |
| EP | 3 252 668 | * | 5/2017 |

(Continued)

OTHER PUBLICATIONS

Machine translation for JP 2018-173676 (Year: 2018).*
(Continued)

*Primary Examiner* — Qian Yang
(74) *Attorney, Agent, or Firm* — LUCAS & MERCANTI, LLP

(57) ABSTRACT

A method for detecting body measurements for use in determining body sizes for tailor-made garments is disclosed. The method includes a step A wherein a user for whom the garment is intended wears a detection device including a matrix having a plurality of markers attached to the matrix. The matrix is configured to be worn to make the markers adhere to a part of the body of the user. The markers are rigid elements and have a graphic sign. Next, the method has a step B in which photographic images of the signs present on the markers on the body part are acquired, followed by a step C in which the distances between the signs of the markers are calculated based on the photographic images. In the final step, a step D, the sizes of the body part are calculated based on the distances calculated in step C.

18 Claims, 2 Drawing Sheets

(58) Field of Classification Search
CPC ........... G06T 2207/30208; G06T 2207/30204;
G01B 11/03
See application file for complete search history.

(56) References Cited

FOREIGN PATENT DOCUMENTS

| EP | 3251536 A1 | 12/2017 |
| JP | 2018-173676 | * 11/2018 |
| WO | WO 2019189846 | * 3/2019 |

OTHER PUBLICATIONS

Machine translation for WO 2019/189846 (Year: 2019).*
Machine translation for CN 101017212 (Year: 2007).*
International Search Report and Written Opinion for Corresponding
International Application No. PCT/IB2021/058988, 11 pages, Jan.
7, 2022.

* cited by examiner

METHOD FOR DETECTING BODY MEASUREMENTS TO DETERMINE SIZES OF A TAILOR-MADE GARMENT

CROSS-REFERENCE TO RELATED APPLICATIONS

This application is a 371 of PCT/IB2021/058988, filed Sep. 30, 2021, which claims the benefit of Italian Patent Application No. 102020000023179, filed Oct. 1, 2020.

TECHNICAL FIELD

The present invention refers in general to a method for detecting body measurements to determine a garment size. More specifically, the present invention refers to a method for the automatic detection of the body measurements of a person to allow the creation of a tailor-made garment even remotely, i.e. without the need for the tailor to acquire the body measurements directly on the person to whom the garment is intended.

BACKGROUND OF THE INVENTION

It is known from US 2004/0227752 a method for acquiring body measurements of a user to whom a garment to be made based on such measurements is intended, the method comprising the following steps in sequence:

wearing, by the user, a suit on which reference points, formed for example by metal buttons, are applied in predefined positions;

taking pictures of the user from different positions in order to acquire images, each showing at least three reference points;

building a three-dimensional model of the user starting from the images thus acquired; and creating a tailor-made garment for the user, the dimensions of which are determined based on the user's three-dimensional model thus generated.

This known document does not provide any indication as to how the metal buttons acting as reference points should be configured. Furthermore, this known document does not deal with the problem of allowing a precise reconstruction of the user's model if at least some of the reference points applied on the suit are obscured or blurred in the photographic images that have been taken.

SUMMARY

It is an object of the present invention to provide a method for the remote detection of body measurements of a user for the creation of a tailor-made garment for the user that allows to obtain reliable body measurements even if the acquired images of the user's body are blurred.

This and other objects are fully achieved according to the invention by virtue of a method as defined in the enclosed independent claim 1.

Preferred modes for carrying out the method according to the invention are set forth in the dependent claims, the content of which is to be intended as an integral part of the following description.

The features and advantages of the present invention will become apparent from the following detailed description, given purely by way of non-limiting example.

BRIEF DESCRIPTION OF THE DRAWINGS

In the following detailed description of the invention, reference will be made to the attached drawings, where.

DETAILED DESCRIPTION

According to the present invention, a method for detecting the body measurements of a user to determine the sizes of a tailor-made garment for that user comprises first of all a step A, in which the user wears a detection device 10 comprising a matrix 11 and a plurality of markers 12 fixed to the matrix 11.

The matrix 11 is configured to be worn by the user so that the markers 12 adhere to at least part of the user's body.

The markers 12 are rigid so as not to deform as a result of the user wearing the matrix 11.

The matrix 11 may be made of an elastically deformable membrane so as to easily adapt to the shape of the part of the user's body on which it is intended to be worn.

Figure 1:
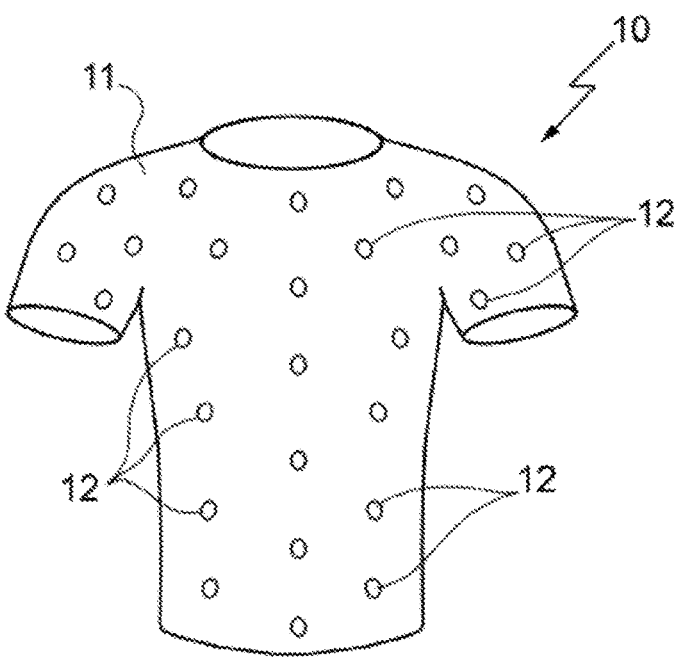
FIG. 1 schematically shows a detection device that can be used in a method for detecting body measurements to determine sizes of a tailor-made garment according to the present invention.

In particular, the matrix 11 may be made in such a way as to cover, once it has been worn, the entire part of the body intended to be covered by the garment to be made. In the non-limiting example of FIG. 1 the detection device 10 has a matrix 11 configured to cover the chest and shoulders of a user to detect corresponding dimensions of the user which are the basis for making, for example, a t-shirt or a polo shirt.

Clearly, if the detection device 10 is to be used for example for making trousers, the matrix 11 will be shaped to cover the pelvis, the thighs and possibly also the legs of the user.

In the context of the present description, the term "rigid" referring to the markers 12 means that they have a behaviour that is not affected by stresses applied to the matrix 11. Therefore, the markers 12, regardless of the material they are made of, are fixed to the matrix 11 in such a way that the latter does not transmit a stress deriving from its deformation to the markers 12. For example, each marker 12 may be attached to the matrix 11 so that a minimum part of the matrix 11 is attached to the marker 12, if that part is sufficiently extended to ensure that the marker 12 is retained to the matrix 11 under normal conditions of use, and, at the same time, to transmit stresses that do not cause a significant deformation of the marker 12.

Each of the markers 12 comprises a graphic sign 13, hereinafter referred simply to as "sign". The markers 12 and the signs 13 are configured so that once the matrix 11 is worn, the signs 13 are exposed to allow the acquisition of a photographic image thereof. For example, the markers 12 may have a first side attached to the matrix 11 and a second side, opposite to the first one, on which the sign 13 is present.

The method according to the present invention also comprises a step B, in which an acquisition of photographic images of the signs 13 provided on the markers 12 attached to the matrix 11 on the part of the user's body to be measured is carried out.

Figure 2:
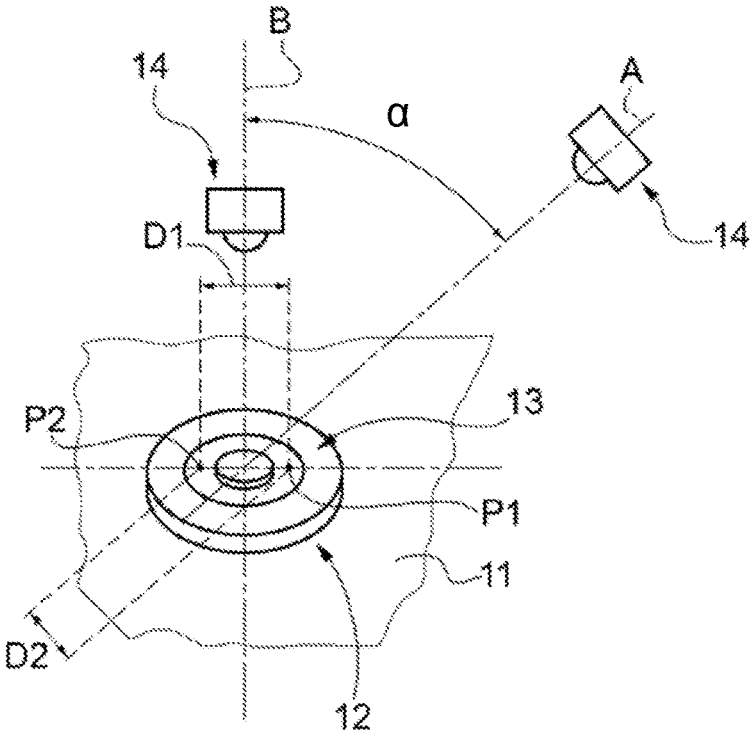
FIG. 2 schematically shows a marker of the detection device of FIG. 1, together with a photographic device that can be used to acquire images of the detection device.

This step B may be carried out by means of a photographic device 14, as shown in FIG. 2. The photographic device 14 may be operated by the user himself or by an auxiliary person, or alternatively may operate automatically, for example based on data acquired by means of a vision system which may be integrated in the photographic device 14 or separate from the photographic device 14 and suitably connected thereto.

As explained further on, the photographic device 14 may be integrated into a portable electronic device such as a smartphone, a tablet or the like.

The method according to the present invention also comprises a step C, which provides for the processing of the photographic images thus acquired so as to calculate data relating to the distance between the signs 13 present on the markers 12 to obtain the dimensions of the part of the user's body on which the garment will be worn.

Furthermore, the method according to the present invention comprises a step D, which provides for calculating the dimensions of said part of the user's body based on the distance data between the signs 13 calculated in step C.

The markers 12 may have auxiliary symbols, in addition to the signs 13, which may be used, for example, to identify the expected position of the marker 12 on a virtual model of the part of the body to be measured. In other words, each marker 12 may be identified by a unique symbol that associates it with a virtual marker having a predefined position in the virtual model of the body part to be measured, said predefined position corresponding to the expected position for the marker 12 when the device 10 is correctly worn by the user. For example, if the detection device 10 is intended to measure a part of the body, such as the user's chest to make a shirt or a T-shirt, each marker 12 of the detection device 10 is attached to a region of the matrix 11 designed to cover, when properly worn, a specific area of that part of the body, for example a user's shoulder.

Step D may involve associating the distance data detected in step C to the virtual markers of the virtual model.

Furthermore, step D may provide for a sizing and proportioning of the virtual model based on the distance data calculated in step C.

In general, the steps described above may be carried out in a specific sequence or in an iterative way or, even, be carried out at the same time, that is to say, be integrated into each other. For example, step C and step D may be integrated in such a way as to consist in a processing of the photographic images to calculate both the distance data between the signs 13 and the dimensions of the part of the body to be measured.

The "distance data" mentioned above may, for example, simply consist in the rectilinear distance calculated between two reference points of the signs 13 or, preferably, in order to facilitate a three-dimensional or two-dimensional reconstruction of the part of the body to be measured, may include both a length representing the linear distance calculated along a trajectory which approximates the shape of the body part to be measured, and angles of inclination of said trajectory at the aforementioned reference points with respect to a direction or to a reference plane of the markers 12.

Step B and step C may be carried out strictly in sequence, i.e. the processing of the images may take place once the acquisition of the images is completed, or, preferably, may be performed iteratively, i.e. the processing provided for in step C may be carried out after the acquisition of one or more images in step B.

The method according to the present teaching may provide that the iteration of steps B and C is interrupted if a predefined condition occurs, for example the condition that the distance data between two signs 13 have been calculated based on a predefined number of images. For example, the iteration of steps B and C may be interrupted when the distance data between two signs 13, for all the markers 12 of the detection device 10, have been calculated based on two images that show the same pair of signs 13 whose distance data are calculated in step C.

Each photographic image is acquired in step B in such a way that it shows the signs 13 of at least two markers 12. In other words, the present method may provide for the acquisition of a plurality of photographic images, from different points of view, so that in general each sign 13 of a marker 12 is present with the sign 13 of at least one further marker 12 in the acquired photographic images. In this way, each image will allow to calculate the distance between the two signs 13 shown therein, thereby increasing the efficiency of the present method.

Step B may provide for the acquisition of a sufficiently numerous plurality of said photographic images, so that each sign 13 is shown in at least two of the photographic images.

Step C may provide for the calculation, for each marker 12, of distance data between the sign 13 of the marker and the sign 13 of each marker 12 adjacent thereto.

Figure 3:
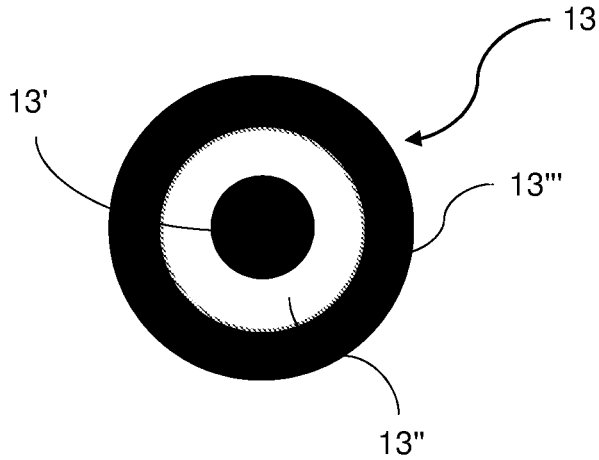
FIG. 3 shows in detail an example of a sign used on a marker of the detection device of FIG. 1.

With reference in particular to FIG. 3, the signs 13 have a central symmetry to allow to cancel, or at least limit, the impact of a possible blur or obfuscation effect of the image of a sign 13 on the calculation of the aforementioned distances.

Preferably, the signs 13 have a circular symmetry, in particular they comprise a plurality of concentric circles or squares forming light areas alternating with dark areas. In the example proposed herein, the sign 13 comprises three concentric circles, defining an innermost area 13' of circular shape, an intermediate area 13" of annular shape and an outermost area 13" of annular shape, wherein the innermost area 13' and the outermost area 13" are dark areas, for example a black areas, while the intermediate area 13" is a light area, for example a white area. Of course, an inverted configuration of the light and dark areas is also possible, i.e. a configuration wherein the innermost area 13' and the outermost area 13" are light areas, for example white areas, while the intermediate area 13" is a dark area, for example a black area.

Step C may provide for the calculation of an inclination of each sign 13 with respect to an acquisition direction A of the photographic image showing that sign, based on the distance between a pair of reference points P1 and P2 of the sign 13. More specifically, this inclination is calculated based on the difference between the distance (indicated D2 in FIG. 2) between the two reference points P1 and P2 detected from the photographic image that shows the sign 13, for example as number of pixels, and the distance (indicated D1 in FIG. 2) between the two reference points P1 and P2 which would result if the photographic image were acquired along a reference direction B, for example a direction perpendicular to the plane on which the sign 13 lies.

The distance between the two reference points P1 and P2 of the sign 13 is maximum, as indicated by D1 in FIG. 2, if measured perpendicular to the reference direction B and decreases, as indicated by D2 in FIG. 2, if measured in a measurement direction perpendicular to the acquisition direction A when the latter is inclined by an angle with respect to the reference direction B.

The reference points P1 and P2 may each consist in a midpoint, along said measurement direction, of a light area, for example a white area, between two dark areas, for example black areas, of the sign 13, to compensate for any effect of blurring or obfuscation of the photographic images. Advantageously, the reference points P1 and P2 are arranged symmetrically with respect to the centre of symmetry of the sign 13. In the example of FIG. 2, the reference points P1 and P2 are midpoints of the central area 13".

The light area and the dark areas will have colours and a mutual chromatic intensity chosen depending on the specific conditions of implementation of the present invention. In particular, the colours and the mutual chromatic intensity may be chosen in such a way that, in conditions of blur and/or poor or inappropriate lighting of the sign 13 to be portrayed, the light area(s) and the dark area(s) are in any case sufficiently distinguishable in a photographic image showing them as to allow the identification of the reference points P1 and P2 and the measurement of the distance between the latter.

The matrix 11 may have at least one first portion intended to cover a first area of the part of the body to be measured and a second portion intended to cover a second area of the part of the body to be measured, wherein the first area has a greater curvature than the second one. In this case, on the first portion the markers 12 will be advantageously applied with a density greater than the density of the markers 12 present in the second portion, in order to optimize the number of markers with respect to the accuracy of calculation of the distances between the signs 13 carried by the markers.

Step C may provide that the distance between two signs 13 is calculated simply by adopting a linear approximation, as the minimum distance between the signs, or by means of a polynomial (for example) approximation, i.e. by estimating or approximating the curvature of the part of the user's body which is comprised between adjacent marks 13.

Figure 4:
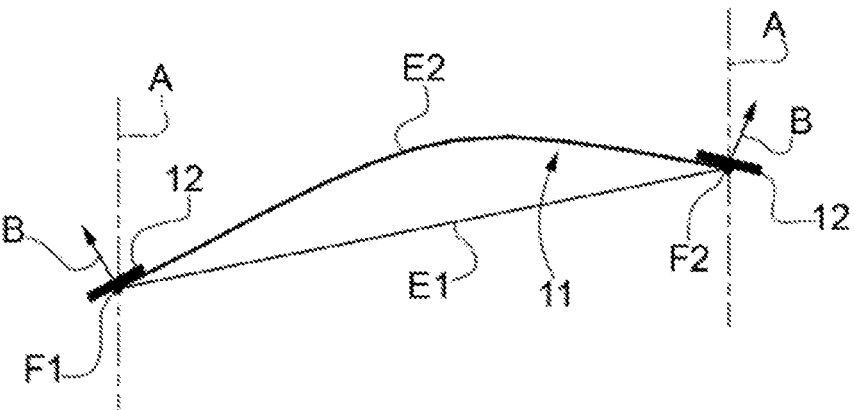
FIG. 4 schematically shows two adjacent markers of the detection device of FIG. 1.

By way of non-limiting example, with particular reference to FIG. 4, the distance between two adjacent signs 13 may therefore be approximated, for example, with the length of the segment E1 which joins the signs 13 along a straight line or, for example, with the length of the curve E2 which joins the signs 13 taking into account the inclinations of these latter calculated as described above.

With reference to FIG. 4, the image coordinates of points F1 and F2, which represent the positions of two adjacent signs 13, are:

$$F1 = (x_1, y_1, \dot{y}_1),$$

$$F2 = (x_2, y_2, \dot{y}_2),$$

where $\dot{y}_1$ e $\dot{y}_2$ are the derivatives of curve E1 in $(x_1, y_1)$ and $(x_2, y_2)$, respectively. The length of curve E2, if approximated to a parabolic section, is thus equal to:

$$L = f(x_2) - f(x_1),$$

where:

$$f(x) = \left\{ \frac{1}{2a} \left[ \frac{2ax+b}{2} \sqrt[2]{1+(2ax+b)^2} + \frac{1}{2}\ln\left|2ax+b+\sqrt[2]{1+(2ax+b)^2}\right| \right] + c \right\}$$

$$a \triangleq (\dot{y}_1 - \dot{y}_2)/2(x_1 - x_2)$$

$$b \triangleq \frac{1}{2}(\dot{y}_1 + \dot{y}_2) - \frac{(x_1 + x_2)}{(x_1 - x_2)}\frac{(\dot{y}_1 - \dot{y}_2)}{2}$$

$$c \triangleq y_1 - bx_1 - ax_1^2.$$

Furthermore, step B may be performed based on instructions made available by an assisting device, not shown, which is connected to the photographic device 14. The assisting device may be programmed to provide instructions, which may be voice instructions, based on the photographic images acquired by the photographic device 14. The assisting device may thus provide the user with instructions for example as how to orient the body part on which the detection device 10 is worn with respect to the photographic device 14 to acquire a number of photographic images such as to allow a complete and reliable calculation of the distance data between all the signs 13 of the markers 12 of the detection device 10.

The assisting device may be connectable to a telecommunication network and may be programmed to transmit, by means of said telecommunication network, to a remote management device, for example to a computer which may comprise a server, data including the photographic images acquired in step B and/or the distance data calculated in step C. Step C may be performed by the same assisting device and/or by the remote management device.

According to the present teaching, the distance data between the signs 13 of the markers 12 calculated in step C may be processed together with the inclination angles α of each sign 13 with respect to the acquisition direction A in order to define a virtual model of the detection device 10 as worn by the user during the acquisition of the aforementioned photographic images.

The present method may also provide for the crafting of a real model of the detection device 10 as worn by the user during the acquisition of the aforementioned photographic images, for example by means of a 3D printing apparatus of a known type, to make this real model available to a tailoring service provider to tailor-make, based on that real model, a garment for the user. In this way, the garment may be made by the tailoring service provider without the need to meet the user in person, while being able to create a perfect tailor-made garment. For example, once the present method has been carried out, the distance data in step C have been acquired and the real model has been created, the tailoring service provider will be able to create the garment and send it to the user, being thus able to propose a service for the remote crafting of high quality tailor-made garments, differently from what is now possible since, according to the traditional technique, it is essential that an operator of the tailoring service provider detects the user's measurements directly on the latter in order to obtain an adequate quality and amount of dimensional data to make a high-quality garment.

It has therefore been found that the present method for the detection of body measurements to determine sizes of a tailor-made garment allows to detect the body measurements of the user to whom the garment is intended in a more reliable way than in the prior art.

Furthermore, the method according to the invention allows the user's body measurements to be determined reliably even in case of blurring of the images of the user's body.

Furthermore, the method according to the invention allows to obtain reliable body measurements in particular without being affected by the variability of the body proportions of the users, due in particular to the lack of deformation of the signs when the detection device is worn, since the signs are made so as not to be affected by the elastic deformation of the matrix of the detection device when the latter is worn.

Many modifications and variations may be made to the invention, all of which fall within the scope of protection of the attached claims.

For example, the markers and/or the signs may differ from each other and may consist of groups which share similarity or identity elements or may all be different from each other to facilitate positional recognition.

Furthermore, all the details may be replaced by other technically equivalent elements.

Where the features referred to are followed by reference marks or numbers, these reference marks or numbers have been used with the sole purpose of increasing the intelligibility of the description and claims and, therefore, they do not limit at all the interpretation of the features identified by these reference marks or numbers.

The invention claimed is:

1. A method for detecting body measurements of a user to determine sizes of a tailor-made garment for the user, the method comprising:

a step A in which the user wears a detection device comprising a matrix and a plurality of markers attached to said matrix, wherein said matrix is configured to be worn by the user to make said markers adhere to at least part of the user's body and wherein said markers are rigid elements and comprise each a graphic sign having one or more light areas alternating with one or more dark areas, said markers and said signs being configured in such a way that, once said matrix is worn by the user, said signs are exposed to allow the acquisition of photographic images thereof;

a step B in which photographic images of the signs present on the markers attached to said matrix on said part of the body are acquired, said photographic images being acquired in such a way that each of them shows at least two signs;

a step C in which said photographic images are processed to calculate distance data between the signs present on the markers attached to said matrix on said part of the body; and a step D in which the sizes of said part of the body are calculated based on the distance data calculated in said step C;

wherein said matrix has a first portion intended to cover a first area of said body part and a second portion intended to cover a second area of said body part with a curvature less than said first area; said first portion having a density of said markers greater than the density of markers present in said second portion.

2. The method according to claim 1, wherein said step B is performed in such a way that the sign of each marker is shown in at least two photographic images.

3. The method according to claim 1, wherein said step C provides for the calculation, for each marker, of distance data between the sign of said marker and the sign of each marker adjacent thereto.

4. The method according to claim 1, wherein said light area(s) and said dark area(s) of the signs are formed by concentric circles or squares.

5. The method according to claim 1, wherein said step C further provides for calculating the inclination (a) of each sign with respect to an acquisition direction (A) in which a photographic image is acquired that shows said sign, said calculation of the inclination (a) being performed based on the difference between the distance (D2) between a pair of reference points (P1, P2) of said sign measured in a measurement direction perpendicular to said acquisition direction (A) and the distance (D1) between said reference points (P1, P2) measured perpendicular to a reference direction (B).

6. The method according to claim 5, wherein said signs are flat and wherein, for each sign, said reference direction (B) is perpendicular to the plane on which said sign lies.

7. The method according to claim 5, wherein said reference points (P1, P2) each consist in a midpoint, along said measurement direction, of a light area between two dark areas of said sign or of a dark area between two light areas of said sign.

8. The method according to claim 1, wherein said step B is carried out based on instructions made available by an assisting device which is connected to a photographic device, said assisting device being programmed to provide said instructions in the form of voice instructions, based on said photographic images acquired by means of said photographic device.

9. The method according to claim 8, wherein said assisting device is connectable to a telecommunication network and programmed to transmit, through said telecommunication network, to a remote management device data comprising photographic images acquired in said step B and/or distance data calculated in said step C.

10. A method for detecting body measurements of a user to determine sizes of a tailor-made garment for the user, the method comprising:

a step A in which the user wears a detection device comprising a matrix and a plurality of markers attached to said matrix, wherein said matrix is configured to be worn by the user to make said markers adhere to at least part of the user's body and wherein said markers are rigid elements and comprise each a graphic sign having one or more light areas alternating with one or more dark areas, said markers and said signs being configured in such a way that, once said matrix is worn by the user, said signs are exposed to allow the acquisition of photographic images thereof;

a step B in which photographic images of the signs present on the markers attached to said matrix on said part of the body are acquired, said photographic images being acquired in such a way that each of them shows at least two signs;

a step C in which said photographic images are processed to calculate distance data between the signs present on the markers attached to said matrix on said part of the body; and a step D in which the sizes of said part of the body are calculated based on the distance data calculated in said step C;

wherein said step C further provides for calculating the inclination (a) of each sign with respect to an acquisition direction (A) in which a photographic image is acquired that shows said sign, said calculation of the inclination (a) being performed based on the difference between the distance (D2) between a pair of reference points (P1, P2) of said sign measured in a measurement direction perpendicular to said acquisition direction (A) and the distance (D1) between said reference points (P1, P2) measured perpendicular to a reference direction (B).

11. The method according to claim 10, wherein said signs are flat and wherein, for each sign, said reference direction (B) is perpendicular to the plane on which said sign lies.

12. The method according to claim 10, wherein said reference points (P1, P2) each consist in a midpoint, along said measurement direction, of a light area between two dark areas of said sign or of a dark area between two light areas of said sign.

13. The method according to claim 10, wherein said step B is performed in such a way that the sign of each marker is shown in at least two photographic images.

14. The method according to claim 10, wherein said step C provides for the calculation, for each marker, of distance data between the sign of said marker and the sign of each marker adjacent thereto.

15. The method according to claim 10, wherein said light area(s) and said dark area(s) of the signs are formed by concentric circles or squares.

16. The method according to claim 10, wherein said matrix has a first portion intended to cover a first area of said body part and a second portion intended to cover a second area of said body part with a curvature less than said first area; said first portion having a density of said markers greater than the density of markers present in said second portion.

17. The method according to claim 10, wherein said step B is carried out based on instructions made available by an assisting device which is connected to a photographic device, said assisting device being programmed to provide said instructions, in the form of voice instructions, based on said photographic images acquired by means of said photographic device.

18. The method according to claim 17, wherein said assisting device is connectable to a telecommunication network and programmed to transmit, through said telecommunication network, to a remote management device data comprising photographic images acquired in said step B and/or distance data calculated in said step C.

\* \* \* \* \*